Oct. 9, 1923.　　　　　　　　　　　　　　　　1,470,004
F. GAHM
VEHICLE SEAT
Filed June 7, 1922　　　2 Sheets-Sheet 1

Inventor:
Frank Gahm
By
Attys.

Oct. 9, 1923.  1,470,004

F. GAHM

VEHICLE SEAT

Filed June 7, 1922  2 Sheets-Sheet 2

Inventor:
Frank Gahm
By
Attys.

Patented Oct. 9, 1923.

1,470,004

UNITED STATES PATENT OFFICE.

FRANK GAHM, OF STREATOR, ILLINOIS.

VEHICLE SEAT.

Application filed June 7, 1922. Serial No. 566,590.

*To all whom it may concern:*

Be it known that I, FRANK GAHM, a citizen of the United States, and resident of Streator, county of La Salle, and State of Illinois, have invented certain new and useful Improvements in Vehicle Seats, of which the following is a specification, and which are illustrated in the accompanying drawings, forming a part thereof.

The invention relates to seats for vehicles, such as automobiles.

Its objects are to enable the seat to be shifted on its support to provide increased room for movement of the passengers in the vehicle, and to permit of the use of the seat as a section of a bed bottom.

These objects are attained by so mounting the seat upon its support that it may have a backward and forward sliding movement; it is swiveled so that it may be faced backwardly; is hinged so that its bottom may be overturned; and is provided with a removable back which, when the seat is to be used as a bed, may be placed flat between the seat bottom and the rear seat.

The invention involves some further details hereinafter pointed out, and it is illustrated in the accompanying drawings, in which Fig. 1 is a front view of the seat;

Figure 1:
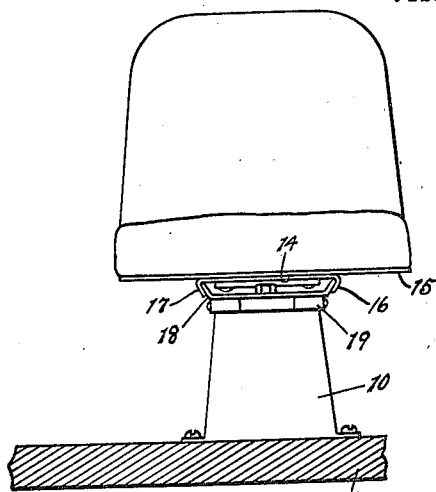
Figure 2:
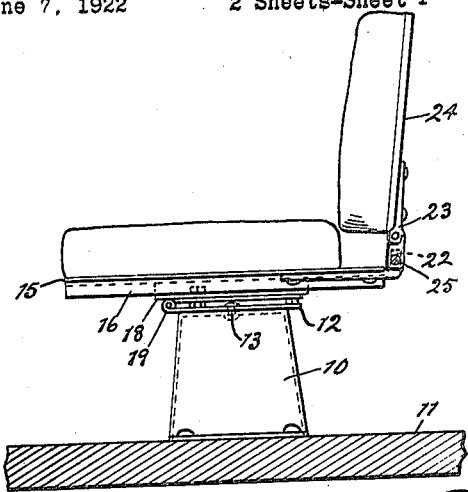
Fig. 2 is a side elevation of the same.

In all of the figures a portion of the floor of a vehicle is shown in section.

In the construction illustrated in Figs. 1, 2, 3, 4, 5, 8 and 9, the support for the seat takes the form of a pedestal 10, which may be secured to the vehicle floor 11 by means of screws or bolts. The top of the pedestal is flat and upon which a plate 12 is centrally pivoted, as shown at 13, to permit rotation in horizontal plane. A plate 14, secured to the under side of the seat bottom 15, is provided with lateral flanges 16, 17, extending from front to rear of the seat bottom and having a sliding dovetail engagement with upstanding flanges on a plate 18 which is hinged, as shown at 19, to the plate 12 adjacent to the forward margin of the seat bottom 15.

Figure 4:
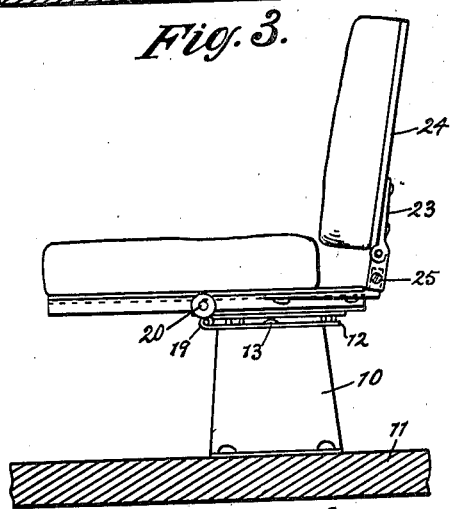
Figs. 4 and 5 are views similar to Figs. 2 and 1, respectively, showing a locking device.
Figure 5:
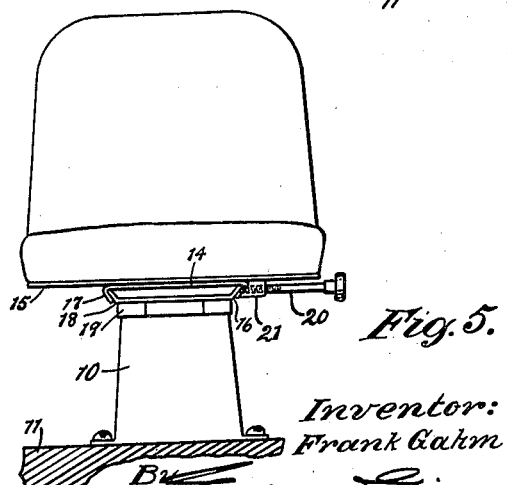

As shown in Figs. 4 and 5, a binding screw 20 may be mounted in a block 21 adjacent to one of the depending flanges, as 16, and extending therethrough, in order that it may impinge upon one of the upstanding flanges of the plate 18 and thus lock the seat against sliding movement. At the back of the seat bottom are mounted a pair of upstanding posts 22, upon which fit a pair of socketed brackets 23 secured to the back 24 of the seat. A screw 25 sets laterally through the wall of the socket of each of the brackets 23 and into the post 22, with which it cooperates for securing the seat back against accidental removal.

Figure 3:
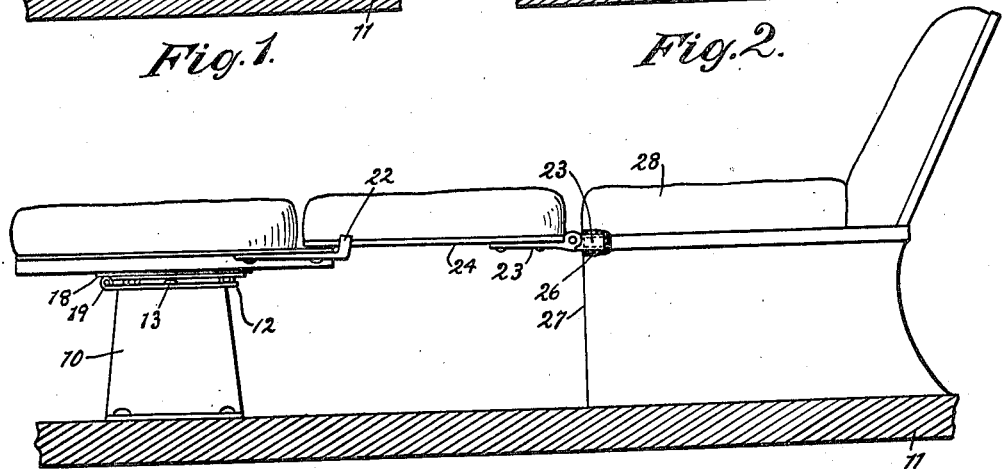
Fig. 3 is a side elevation of the seat with its back positioned as a section of a bed, and showing also a detail of the rear seat of the vahicle.

A pair of studs, as 26, are secured in suitable position, as to the front wall 27 of the support for the back seat 28 of the vehicle, to receive the sockets of the brackets 23 when the seat is to be used as a bed. For this use the upper end of the back is rested upon the rear end of the framing of the front seat, as shown in Fig. 3.

Figure 8:
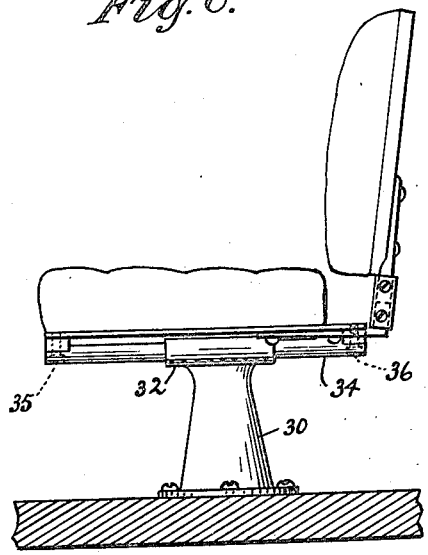
Figs. 8 and 9 are views similar to Figs. 4 and 5, showing a further modification.
Figure 9:
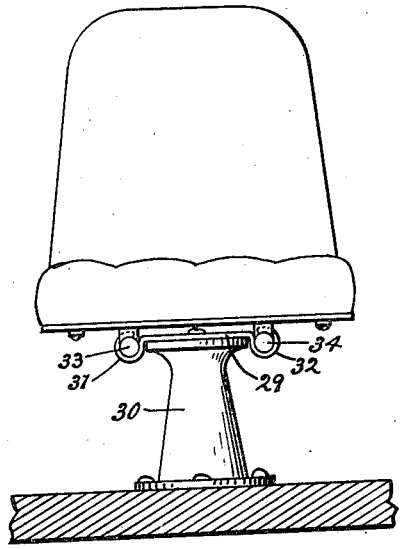

In the construction of Figs. 8 and 9 the plate 29 is swiveled upon the pedestal 30, and corresponding to the plate 18 already described, is provided with a pair of flanges 31, 32, curved to partially tubular form, the enclosed channels, however, being upwardly open and a pair of round bars 33, 34, secured to the seat bottom, as by means of screws 35, 36, slidably fitted within these tube sections.

Figure 6:
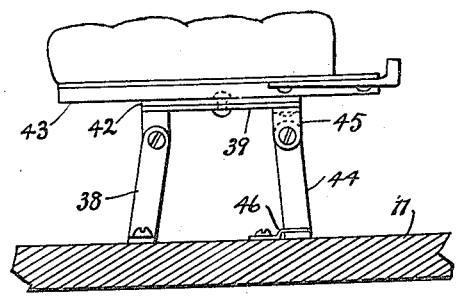
Figs. 6 and 7 are side and front elevations of the seat with the back removed, and showing a modified form of support.
Figure 7:
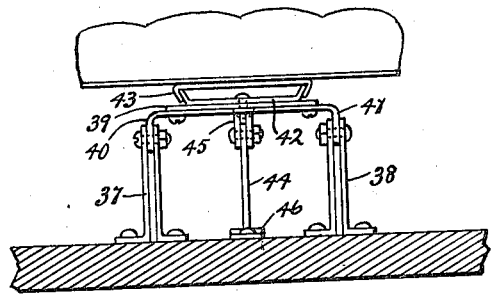

In the construction of Figs. 6 and 7 there is shown a pair of posts 37, 38, as substitutes for a pedestal. A plate 39, having downturned flanges 40, 41, hinged to the posts 37, 38, provides a support for the swiveled plate 42, with which a plate 43, attached to the seat bottom, has sliding dovetail engagement. A bracing post 44, pivotally secured to a bracket 45 depending from the plate 39, engages a keeper 46 secured to the vehicle floor 11, and with the posts 37, 38, firmly supports the seat.

I claim as my invention—

1. In a vehicle seat, the combination of a support, a plate rotatably mounted on said support to turn about a substantially vertical axis, a second plate hinged to the first plate to swing about a substantially horizontal axis and a seat bottom slidably mounted on said second plate to move backward and forward.

2. A vehicle seat comprising a bottom section, a plate upon which the bottom is slidably mounted to move forward and backward, a pedestal, a plate swiveled upon the pedestal, and hinge connection between the two plates adjacent the front margin of the bottom.

3. A vehicle seat comprising a bottom section, a plate upon which the bottom is slidably mounted to move forward and backward, a pedestal, a plate swiveled upon the pedestal, hinge connection between the two plates adjacent the front margin of the bottom, a pair of posts projecting upward from the rear margin of the bottom, and a back having sockets for fitting upon the posts.

4. In a vehicle seat, the combination of a support, a seat bottom having back and forth sliding movement and rotary movement relative to said support and also having tilting movement relative to the support independent of the sliding movement and a leg pivoted to the bottom and engageable with a floor lug for holding the bottom against tilting movement.

5. A vehicle seat comprising a bottom section, a plate upon which the bottom is slidably mounted to move forward and backward, a pedestal, a plate swiveled upon the pedestal, hinge connection between the two plates adjacent the front margin of the bottom, a pair of posts projecting upward from the rear margin of the bottom, a back having sockets at one end for fitting upon the posts, and independently mounted means for receiving the sockets on the back when the back is removed from the bottom section, and said bottom section supporting the opposite end of the back.

6. In a vehicle seat, the combination of a support, a plate pivoted to the support to swing about a horizontal axis, a leg pivoted to the plate and supplementing the support, a second plate swiveled on the first plate and a seat slidably mounted on the second plate to move back and forth.

FRANK GAHM.